July 16, 1940. H. G. BUSIGNIES 2,208,209
RADIO DIRECTION FINDER
Filed Dec. 17, 1937

INVENTOR:-
H. G. BUSIGNIES
BY
*E. D. Phinney*
ATTORNEY

Patented July 16, 1940

2,208,209

UNITED STATES PATENT OFFICE 2,208,209

RADIO DIRECTION FINDER

Henri Gaston Busignies, Paris, France, assignor to International Standard Electric Corporation, New York, N. Y.

Application December 17, 1937, Serial No. 180,355
In France December 24, 1936

4 Claims. (Cl. 250—11)

The present invention relates to devices sensitive to the direction of propagation of electromagnetic waves and more particularly to direct reading indicator systems such as those employed for radio-goniometric bearings.

The invention in particular provides in accordance with certain of its features for systems with rapid indications in which continuous variations of current or of voltage give a semi-instantaneous luminous indication without appreciable inertia according to the relative positions of the transmitting station and the apparatus concerned. In such systems the appearance on a fluorescent or phosphorescent screen of the directional curve of the wave collector of the apparatus is utilised by transforming it into a straight line or a dot characterising the direction sought of the electromagnetic waves.

In systems such as those for the radio guiding of vehicles, particularly aeroplanes and ships, the signals are usually received by means of a frame or direction finder which rotates regularly at a speed for example of 50 revolutions per minute with or without a co-operating non-directional antenna and connected with a radio-electric receiver of the usual type. In accordance with certain features of the invention this receiving device is associated with an apparatus transforming into instantaneous luminous indications the currents or voltages at the output of the receiver derived from the signals of the station providing a bearing. This apparatus may consist, for example, of a mechanical or cathode ray oscillograph which is adapted to rotate in synchronism with the frame, means being provided to determine instantaneously by means of the indication supplied by said oscillograph, the angular displacement between the direction of the axis of the flying machine for example, and the direction of the transmitting station.

However, as the displacement as defined hereinabove may not give sufficient precision, by reason of possible distortion by the receiver of the curves of current or voltage variation, the invention provides, in accordance with certain further characteristics, devices permitting the measurement of the displacement with respect to the whole of the directional curve of the wave collector by means of the symmetry of the curves of current or voltage variation on either side of their axes, the integration of the effects of the current or voltage automatically eliminating the errors and utilising a far greater part of the available energy than that which can be utilised in the definition of the displacement by means of a point of the curve only.

The invention will be explained in more detail in the following description based on the attached drawing, in which.

Figure 1:
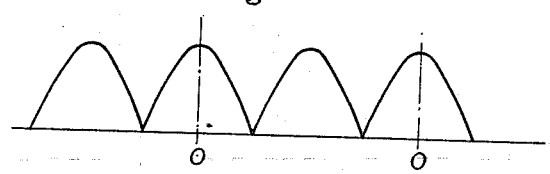
Figs. 1 and 2 show, in cartesian and polar co-ordinates respectively, the variation curve of the output current of the radio-electric receiver in the case of reception of guiding signals by rotating frame or direction finder.

Fig. 1 shows the variation curve of a current at the output of an ordinary receiver amplifying and detecting the guiding signals received from a radio-electric station by a rotating frame or direction finder. The original axis as indicated at 0 may be chosen as desired; in the case of Fig. 1 it is directed towards the station to be received, that is to say, at the moment of maximum reception of the signals the frame or finder is parallel to this axis.

Figure 2:
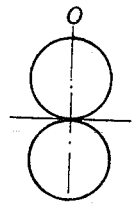

Fig. 2 shows in polar co-ordinates the same current diagram: this drawing has the advantage of showing the directivity of the wave collector, frame or finder.

Figure 3:
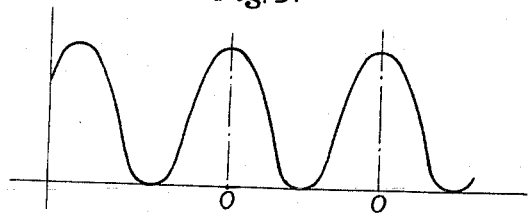
Figs. 3 and 4 show respectively the same curves in the case of reception by combination of frame or finder and relatively non-directional antenna.
Figure 4:
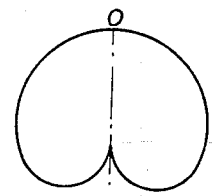

Figs. 3 and 4 show the same current curves in cartesian and polar co-ordinates respectively, in the case in which the wave collector is combined with a non-directional antenna. The effects of the wave collector and the antenna are such that their combination gives a diagram showing the sense as well as the direction for the transmission station and thus eliminates the ambiguity of 180° which exists for the method of reception of Figs. 1 and 2. Fig. 4 shows the corresponding well-known cardioid diagram.

With these two methods of reception, the invention provides, in accordance with certain of its characteristics, indicator devices permitting the integration of the variable current effects in order suitably to effect the measurement of the angular displacement of the direction of the frame with respect to the whole of the directional curve. Such indicating devices may, for example, consist of either mechanical or cathode ray oscillographs, or any other suitable arrangement giving a luminous indication resulting from the characteristics of the received signals.

Figure 5:
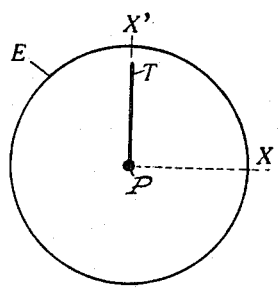
Fig. 5 shows the indication given by a meter of the mechanical oscillographic type with a single axis of deflection.

Fig. 5 shows the luminous indication obtained on a fluorescent or phosphorescent translucent screen E placed in front of a mechanical oscillograph having a single axis of deflection, the screen preserving a temporary luminescence for a fraction of a second. This screen E is driven in rotation around its centre in absolute synchronism with the movement of the frame or finder whose rotation produces the variable current which supplies the desired luminous indication. The indication is produced, as shown, in the direction TX' along which it gives a luminous dash PT. This indication is not directly visible to the observer because all the points of the screen are describing circles on account of its movement.

In order to make this indication visible in the form of a dash starting from the centre P of the screen and directed in accordance with a direction whose angle with the direction PX gives the desired angle of displacement, an opaque screen is provided in front of the translucent screen; this opaque screen is provided with a narrow slot the width of the luminous point and of suitable shape as stated further on, and is driven with a rotary movement of the same speed as, but opposite direction to, the direction of rotation of the fluorescent screen.

If the form of the narrow slot of the opaque screen is such that it exactly reproduces the form of the current curve which is traced on the fluorescent screen, it clearly appears that the curve traced on the screen and the curve of the slot will intersect along a straight line which starts from the middle of the screen and whose angle with respect to PX will give the desired displacement, that is the direction of the transmitting station.

This luminous straight line will characterise the direction of the station. An ambiguity of 180° in direction occurs when the reception is made with a frame combined with a non-directional antenna system, that is to say with a receiving system giving a current curve similar to that shown in Fig. 4. If the receiving system only comprises a simple frame, the curve given will correspond to the curve shown in Fig. 2 and the luminous lines obtained will produce an indication having a 90°–270° ambiguity in addition to the 180° ambiguity of the other circuit.

Figure 6:
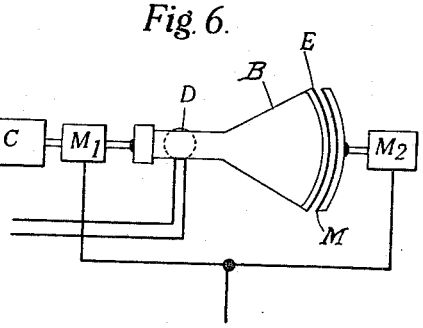
Fig. 6 shows an embodiment of an indicator device employing features of the invention.

A similar indication can be obtained by employing a cathode ray oscillograph with a fluorescent screen rotating at the same speed as the frame, as shown by way of example in Fig. 6. In this drawing the direction finder or frame, the driving motors of the frame and the oscillograph B and of the opaque screen M, are indicated schematically by the corresponding blocks C, M1 and M2 respectively. E indicates the fluorescent screen of the cathode oscillograph which may be of any suitable type, in which, as shown at D, the fixed means of deflection of the cathode ray (solenoidal coil or deflection plates) are provided outside the envelope of the rotating oscillograph B whereby the deflection of the cathode ray is always effected in the same direction. It is clear that the representation given is quite schematic, and that other arrangements of cathode ray oscillograph devices and driving motors may be employed.

It is clear that the fluorescent screen of the cathode ray oscillograph must be of a substance having a persistence of fluorescence of a fraction of a second greater than the duration of a complete revolution.

Figure 7:
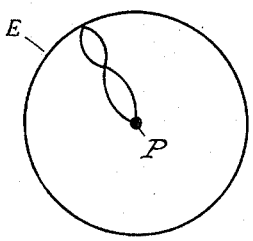
Figs. 7, 8 and 9 show indications given by an oscillograph of the cathode ray type.
Figure 8:
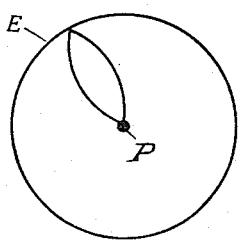
Figure 9:
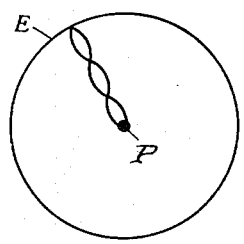

It is also clear that in both cases, utilisation of a mechanical oscillograph with a separate fluorescent or phosphorescent screen, or utilisation of a cathode ray oscillograph with fluorescent screen, the amplitude of the deflection of the oscillograph must be such that the image traced on the screen is of the same size as that shown by the slot of the opaque screen, in order to prevent distortions of the luminous indicating line. This amplitude of deflection may be obtained and adjusted at a practical constant value by means either of an automatic amplification control at the end of the receiver or of a manual adjustment of the amplification of the receiver. Moreover, the symmetrical distortions of the curves, such as the curves 2 and 4, on the fluorescent screen will have the shapes shown in Figs. 7, 8 and 9. These distortions being symmetrical do not impair the reading because they always determine exactly the axis indicated for the transmitting station. Such distortions must be compensated by a suitable provision of the slot of the opaque screen which will be cut with a corresponding distortion after a preliminary test of the oscillograph.

In the foregoing specification no means of directly measuring the angular displacement has been considered. It is, however, clear that such means may simply consist of a dial graduated for example in degrees, which surrounds the opaque screen or the screen of the oscillograph according to the method of direction finding employed. Such a screen permits the direct reading of the direction of the station either with respect to the direction of the magnetic or true north, if the installation is on land, or with respect to the axis of travel of a machine if the apparatus is arranged on a machine, again either directly with respect to the north, the graduated dial then being movable and connected to a gyro-compass or a gyro-compass repeater or a magnetic compass which will displace it by the angle of the path of the machine with respect to the north.

What is claimed is:

1. Radio direction finder comprising a continuously rotatable wave collector, means for deflecting a pointer ray according to the intensity of signals in said wave collector, a screen indicating the position of the ray rotatable in synchronism with the wave collector and an apertured shutter in front of the screen rotatable at the speed of said screen in a direction opposite to that of the screen, said aperture approximating the curve traced by said ray on said screen whereby a stationary direction-determining indication is obtained.

2. Radio direction finder comprising a continuously rotatable wave collector, an oscillograph rotated in synchronism with the wave collector and controlled as to its deflection by the wave collector and an apertured shutter parallel with and overlying the oscillograph screen and rotated in synchronism therewith but in opposite direction to give a stationary direction-determining indication said aperture approximating the curve traced on said oscillograph screen.

3. Radio direction finder according to claim 2, including a fixed graduated dial or scale operatively associated with the oscillograph screen.

4. Radio direction finder according to claim 2 in which a non-directional antenna co-operates with a directional loop wave collector.

HENRI GASTON BUSIGNIES.